United States Patent Office 3,320,876
Patented May 23, 1967

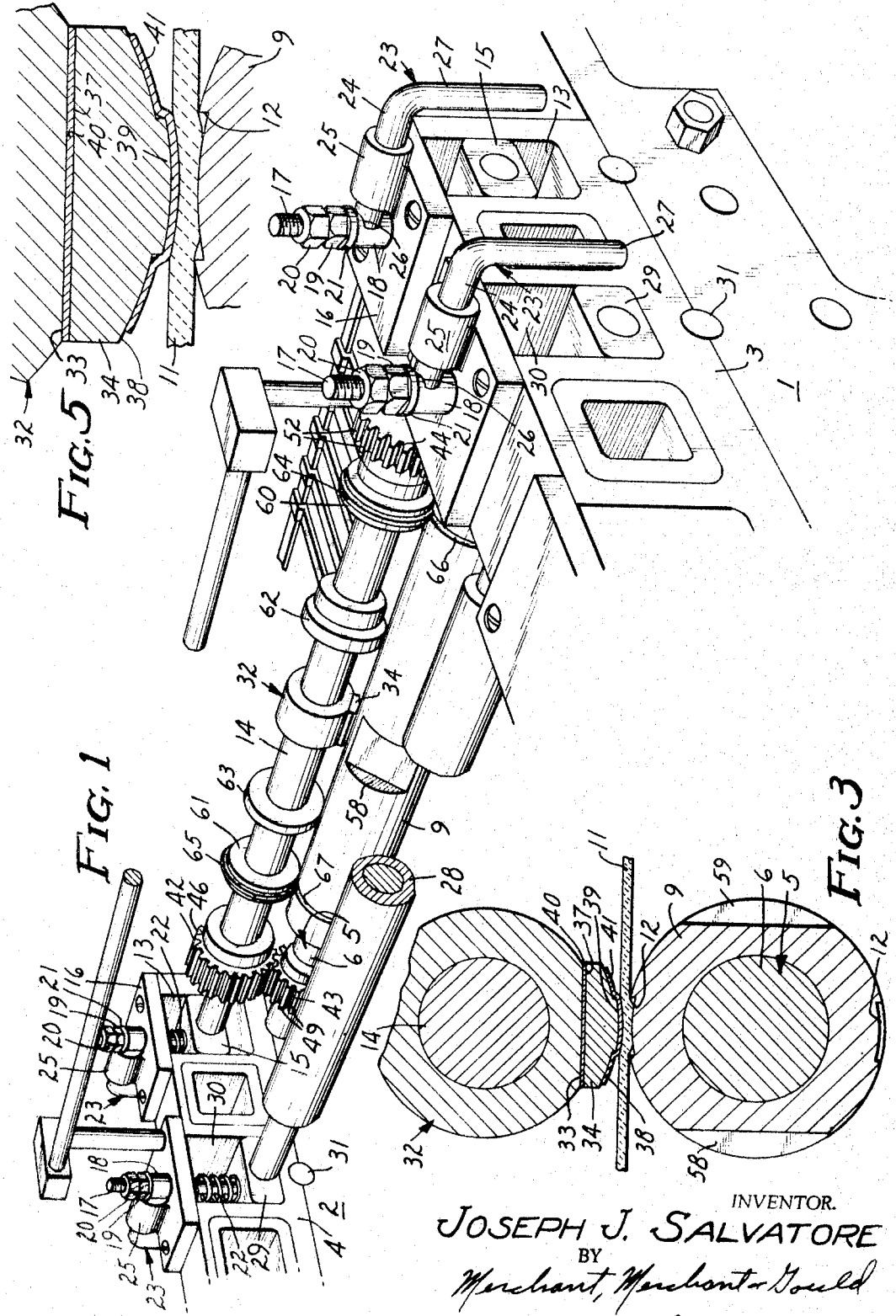

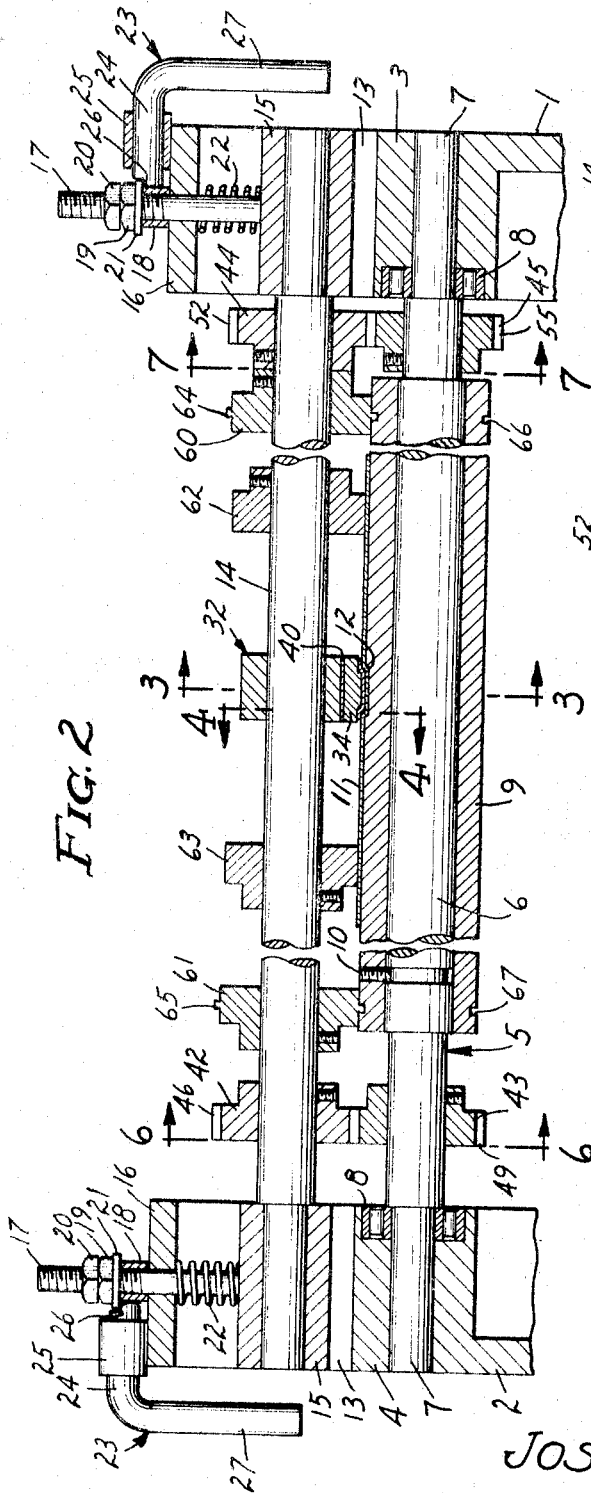

3,320,876
EMBOSSING APPARATUS FOR ENVELOPE MACHINES
Joseph J. Salvatore, Minneapolis, Minn., assignor to Heinrich Envelope Co., Minneapolis, Minn., a corporation of Minnesota
Filed Nov. 6, 1963, Ser. No. 321,837
4 Claims. (Cl. 101—23)

This invention relates generally to embossing apparatus, and more particularly it relates to improvements in embossing apparatus of the rolling die type for use in envelope machines.

The structure of the envelope machines to which the present invention relates generally comprises a pair of end frame members in which generally vertically spaced upper and lower rollers or shafts are mounted for rotation to direct or pass envelopes therebetween. An important object of the present invention is the provision of embossing apparatus for the above-noted rollers or shafts of the machine which provides greatly improved embossing action or engraving of the envelope material.

Another important object of the present invention is the provision of embossing apparatus for envelope machines which includes a sleeve having a female recess and secured on the lower shaft and a male boss secured on the upper shaft for cooperation with the recess of the lower shaft for embossing the envelope material passing between the shafts upon revolution of the upper and lower shafts.

A particular problem characteristic of previously known embossing arrangements and apparatus for envelope machines has been the inability to prevent slight misalignment or mismating betwen the male boss and female recess whereby penetration or cutting of the embossed portion of the envelope material often results, along with excessive wear to the embossing dies. With this in mind, an important object of the present invention is the provision of embossing apparatus for envelope-making machines which is constructed so as to eliminate or greatly reduce the above-noted previous problem of pinching or penetration of the embossed portions of the envelopes.

Another object of the present invention is the provision of embossing apparatus for envelope making-machines which includes driving means having two pairs of axially spaced gears for the upper and lower rollers or shafts of the machine and in which the first pair of gears are disposed relative to one another with the leading faces of the teeth of one of the first pair of gears engaging the trailing faces of the teeth of the other thereof and the second pair of gears are disposed relative to one another and relative to the first pair of gears with the trailing faces of the teeth of one of the second pair of gears engaging the leading faces of the teeth of the other of the second pair of gears whereby backlash between the gears and play between the shafts is greatly reduced and alignment between the male boss and the female recess as the envelope material passes therebetween is assured.

Another object of the present invention is the provision of embossing apparatus for envelope machines which includes mean on the upper shaft for maintaining the required spacing between the male boss of the upper shaft and the female recess of the lower shaft and also for maintaining each pair of the first and second pairs of gears disposed with their pitch circles generally tangent.

A still further object of the present invention is the provision of a lower roller journalled in the end frame members which comprises an elongated central shaft and an elongated sleeve secured on the shaft and having a female recess in the outer surface thereof.

Other objects of the present invention reside in the provision of embossing apparatus for envelope machines which includes the provision of a sheet of thin resilient material secured on the male boss, and which embossing apparatus is relatively simple in construction, requires relatively little adjustment, and provides generally increased operating efficiency.

The above and still further objects and advantages of the present invention will become apparent from a consideration of the following detailed specification, appended claims and attached drawings.

Referring to the drawings, wherein like reference characters indicate like parts or elements throughout the several views:

FIG. 1 is a view in perspective showing a fragmentary portion of an envelope-making machine with my novel embossing apparatus thereon;

FIG. 2 is a view in vertical section taken generally through the axes of the upper and lower rollers or shafts of the apparatus, some parts being broken away;

FIG. 3 is an enlarged view in vertical section taken on the line 3—3 of FIG. 2;

FIG. 4 is an enlarged view in vertical section taken on the line 4—4 of FIG. 2;

FIG. 5 is a further enlarged view in vertical section corresponding to a portion of FIG. 3;

FIG. 6 is an enlarged view in vertical section taken on the line 6—6 of FIG. 2;

FIG. 7 is a view in vertical section taken on the line 7—7 of FIG. 2; and

FIG. 8 is an enlarged view in perspective of the plate-like shoe which carries the male boss.

Referring to the drawings, and particularly FIG. 1 thereof, an envelope-making machine is partially shown therein, the same including a supporting frame structure comprising opposed end frame members 1, 2 having bearing housings 3, 4, respectively.

A lower feed roller, represented generally by the reference numeral 5, is journalled within the opposite end frame members 1, 2. The lower roller 5 comprises an elongated central shaft 6 the opposite end portions 7 of which are received within axially aligned openings and corresponding bearings 8, as shown in FIG. 2. An elongated generally cylindrical sleeve 9 is secured to the generally intermediate portion of the central shaft 6 by means of a set screw 10 or the like. The lower roller 5 acts as a lower rotary supporting or feed surface for the moving envelope material 11. Referring particularly to FIGS. 2 and 3, it will be noted that the outer surface of the sleeve 9 of the lower roller 5 defines a pair of diametrically opposed female dies or recesses 12 which form the female portion or matrices of the embossing apparatus disclosed herein.

The bearing housings 3, 4 of the end frame members 1, 2 define axially aligned generally rectangular openings 13 disposed in generally vertical alignment above the opposite end portions 7 of the shaft 6. An upper shaft 14 or roller assembly is journalled in the rectangular opening 13 of the bearing housings 3, 4 in general parallelism with the lower roller 5 by means of bearing blocks 15 disposed within the openings 13, as shown particularly in FIGS. 1 and 2. The upper portions of the rectangular openings 13 are defined by removable plates 16 each one secured by means of suitable fasteners to a different one of the opposed bearing housings 3, 4.

In order to provide means for yieldingly biasing the upper shaft 14 towards the lower roller 5, the bearing blocks 15 are provided with upstanding studs 17 which project through generally centrally located openings in the plates 16 and also through axially aligned bearing sleeves 18. Referring particularly to FIG. 2, the upper end portions of the studs 17 are screw threaded to receive adjustment nuts 19 and lock nuts 20, respectively, with a washer 21 interposed between the adjustment nut 19 and the bearing sleeve 18 on each of the studs 17. In order to yieldingly bias or apply pressure on the upper shaft 14 in a direction towards the lower roller 5, coil springs 22 are interposed between the bottom surfaces of the removable plates 16 and the upper surfaces of the bearing blocks 15, and in order to relieve the pressure or bias on the lower roller 5 by the rotary contacting elements, noted hereinafter, of the upper shaft 14, a pair of levers 23 are one each mounted to a different one of the plates 16 for cooperation with the adjacent studs 17. Each of the levers 23 defines a horizontal portion 24 which is journalled within a bearing sleeve 25 secured, as by welding or the like, to the upper surface of the adjacent one of the plates 16. Further, each of the levers 23 is cut away at its inner end portion to define a cam surface 26 which engages the adjacent under surface of the corresponding washer 21. The levers 23 also define handle portions 27 for moving the cam surfaces 26 so as to raise and lower the studs 17 and therefore raise and lower the upper shaft 14 with respect to the lower roller 5.

It will be understood that the envelope machine also comprises one or more guide rollers 28 disposed ahead of the previously described upper shaft 14 or roller assembly, and only one of the guide rollers 28 is shown in the drawings, the same being mounted or journalled by means of bearing blocks 29 received within corresponding rectangular openings 30 defined in the bearing housings 3, 4, in a manner similar to the mounting of the upper shaft 14. It is also noted that the upper guide roller 28 may be raised and lowered with respect to the bearing housings 3, 4 by means of a stud and cam assembly, as previously described in connection with the upper shaft 14. Envelope machines of the character described herein also include one or more lower guide rollers, not shown, for cooperation with the upper guide rollers 28 for transporting or moving the envelope material 11 through the envelope machine. One of the lower guide rollers, not shown, would be journalled within the bearing bores 31 of the end frame members 1, 2.

In accordance with the present invention, an embossing member in the form of a generally circular and annular collar 32 is rigidly secured by suitable means, not shown, to the upper shaft 14. The collar 32 is positioned axially of the shaft 14 for general transverse alignment with the female recesses 12 of the lower roller 5, as shown particularly in FIG. 2. The collar 32 defines a generally flat circumferentially spaced mounting surface 33 upon which is mounted or secured a generally plate-like shoe 34, as shown in FIG. 4. The configuration of the shoe 34 is shown particularly in FIG. 8, and the same is secured to the collar 32 by means of a pair of axially spaced and recessed cap screws 35 and a pair of axially spaced alignment studs 36. The inner surface 37 of the shoe 34 is generally flat, and the outer surface 38 thereof is generally arcuate and defines a male boss or die 39 for cooperation with and axially alignable with the female recesses 12 of the sleeve 9 of the lower roller 5. In order that the mounted position of the shoe 34 with respect to the collar 32 may be adjusted, an intermediate shim 40 may be inserted therebetween.

An important feature of the present invention is the provision of a sheet of thin resilient adhesive material 41 for covering the male boss 39. The thin sheet of adhesive material 41 has been found to be of importance for providing the desired amount of slight cushion between the male boss 39 and the female recess 12 whereby to provide an even impression upon the envelope material. Only for the purposes of illustration, it will be noted that plastic electrician's tape has been found to be a satisfactory material for application to the male boss or die 39, the same being easily and quickly removed and replaced when it becomes worn. With this arrangement, and upon rotation of the upper shaft 14 of the lower roller 5, an even embossing of the envelope material 11 passing between the upper shaft 14 and the lower roller 14 is obtained, as will be noted hereinafter.

The present invention further includes novel drive means for imparting rotation to the lower roller 5 and the upper shaft 14, and said drive means includes an important arrangement for causing and assuring relative angular alignment between the male boss or die 39 of the upper shaft 14 and the female recesses 12 of the roller 5 as the envelope material 11 passes therebetween so as to prevent cutting or breaking of the envelope material 11 by a slight mismating of the dies, as often happens with previously known embossing apparatus. In accordance with the present invention, the above-noted drive means comprises a first pair of cooperating spur gears shown in FIG. 6 disposed adjacent one end portion of the lower roller 5. The upper gear 42 of the first pair of gears is rigidly secured to the upper shaft 14 generally adjacent the bearing housing 4, and the lower gear 43 of the first pair of gears is rigidly secured to the shaft 6 of the lower roller 5, as shown in FIG. 2. It is noted that other drive means, not shown, is also provided in cooperation with one of the gears 42, 43 or the upper shaft 14 or the lower shaft 6 for imparting the initial driving power thereto. Referring to FIG. 6, the upper gear 42 and the lower gear 43 rotate in opposite angular directions. The drive means noted above also comprises a second pair of cooperating spur gears which are disposed adjacent the other end portion of the lower roller 5 generally adjacent the bearing housing 3. The second pair of gears includes an upper gear 44 secured on the upper shaft 14 and a lower gear 45 secured on the shaft 6 of the lower roller 5, with their respective opposite directions of rotation shown in FIG. 7.

Referring to FIG. 6, and the respective directions of rotation shown therein, the teeth 46 of the upper gear 42 define leading faces 47 and trailing faces 48, and the teeth 49 of the lower gear 43 define leading faces 50 and trailing faces 51. Similarly, with respect to the second pair of gears shown particularly in FIG. 7, the teeth 52 of the upper gear 44 define leading faces 53 and trailing faces 54, and the teeth 55 of the upper gear 44 define leading faces 56 and trailing faces 57.

An important feature provided by the two pairs or sets of gears 42–45 is the positioning of the gears 42–45 on their respective shafts for the general elimination of backlash or slippage between the gears 42–45 so as to prevent play between the shafts 6 and 14. With this arrangement, misalignment is prevented between the mating male boss or die 39 and the female recesses 12 upon driving rotation of the shafts 6, 14 and embossing of the envelope material 11 moving therebetween. More particularly, the first pair of gears 42, 43 are disposed relative to one another and secured on the respective shafts 6, 14 with the leading faces 47 of the teeth 46 of the upper gear 42 engaging the trailing faces 51 of the teeth 49 of the lower gear 43, as illustrated in FIG. 6. Also, in referring to FIG. 7, the leading faces 56 of the teeth 55 of the lower gear 45 of the second pair of gears 44, 45 are disposed in engagement with the trailing faces 54 of the teeth 52 of the upper gear 44. It will be appreciated that when the gears 42–45 are properly aligned and adjusted relative to their respective shafts 6, 14, the male boss or die 39 will be caused to meet generally exactly with the female recesses or matrices 12.

By way of example only, a gearing ratio of four revolutions of the upper shaft 14 to five revolutions of the lower roller 5 is illustrated, and accordingly, the upper gears 42, 44 are provided with 25 teeth, and the lower gears 43, 45 are provided with 20 teeth and they illustrate an embodiment of the present invention. Referring to FIG. 3, and starting with the male boss 39 meeting with or in alignment with the female recesses 12 for embossing the envelope material 11 passing therebetween, one complete rotation of the upper shaft 14 will place the male boss 39 in alignment with a radially reduced flat portion 58 on the sleeve 9 of the lower roller size, and since two female recesses 12 are provided for on the sleeve 9, a second full revolution of the upper shaft 14 will cause alignment of the male boss 39 with the second female recess 12 shown at the bottom of FIG. 3. Similarly, a third complete relovlution of the upper shaft 14 will cause alignment of the male boss 39 with a radially reduced flat portion 59 on the sleeve 9, and the fourth complete revolution of the upper shaft 14 will return the parts or elements to the relative positions shown in FIG. 3. With this arrangement, the passing envelope material 11 will be embossed when the male boss or die 39 meets with each of the female recesses 12, but no mating or bossing will be imparted when the male boss 39 meets the flat portions 58, 59 since clearance between the mating surfaces is thereby divided.

In order to maintain the desired spacing between the male boss 39 of the upper shaft 14 and the female recesses 12 of the sleeve 9 of the lower roller 5, a pair of circular collars 60, 61 are secured on the upper shaft 14 each one on an opposite side of the embossing collar 32 and each one also generally adjacent a different one of the end portions of the sleeve 9 or the lower roller 5, as shown particularly in FIGS. 1 and 2. The collars 60, 61 are of such diameter as to have their other cylindrical surface portions disposed in engagement with the adjacent surface portions of the sleeve 9 of the lower roller 5 on opposite sides of the passing envelope material 11, as shown particularly in FIG. 2. The collars 60, 61 define outwardly projecting circumferential flange portions 64, 65, respectively, which cooperate with corresponding circumferential grooves 66, 67, respectivly, defined in the lower sleeve 9, to provide thrust bearings which insure alignment of the female dies or recesses 12 with the male boss 39, in an axial direction.

The collars 60, 61 also serve to maintain the above-noted first pair of gears 42, 43 and the second pair of gears 44, 45 disposed with their pitch circles generally tangent so as to keep the upper gears 42, 44 properly positioned relative to the lower gears 43, 45 and generally prevent any play between the gear teeth. Of course, the collars 60, 61 also serve to prevent floating between the upper shaft 14 and the shaft 6 of the lower roller 5. As noted, this arrangement assures the proper meeting and alignment between the male boss or die 39 and the female dies or recesses 12 upon rotation of the shafts 6, 14. It is also noted that intermediate collars or rollers 62, 63 are secured on the upper shaft 14 and disposed between the embossing collar 32 and the collars 60, 61. The outer cylindrical surfaces of the intermediate collars 62, 63 engage the passing envelope material 11, as shown in FIG. 2, and the intermediate collars 62, 63 are axially adjustable relative to the shaft 14 according to the size of the envelope material 11 being run on the machine.

Having specifically described the present invention, it will be obvious that the passing envelope material 11 is embossed when the male die or boss 39 meets the female recesses 12 on the sleeve 9 of the lower roller 5, and the thin sheet of resilient plastic material 41 or the like which is suitably secured to the outer surface of the male boss 39 provides the resiliency necessary to effect a proper and desirable clear and even imprint or boss on the passing envelope material 11. Of course, the compression of the coil springs 22 presses or biases the component parts of the upper shaft 14 into engagement with the adjacent parts of the lower roller 5, as noted above.

This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claims.

What is claimed is:

1. In an envelope-making machine having a frame structure comprising opposed end frame members:
   (a) a lower roller journalled in said end frame members, said lower roller comprising:
      (1) an elongated central shaft,
      (2) an elongated sleeve secured on said shaft, and
      (3) said sleeve having a female recess in the outer surface thereof,
   (b) an upper shaft journalled in said end frame members in general parallelism with said lower roller,
   (c) an embossing member on said upper shaft and having a male boss for cooperation with the recess of said lower roller for embossing envelopes passing between said lower roller and said upper shaft, and
   (d) drive means for imparting rotation to said lower roller and said upper shaft and causing alignment between said male boss and said female recess as the envelope material passes therebetween, said drive means comprising:
      (1) a first pair of cooperating spur gears disposed adjacent one end portion of said lower roller and one thereof being secured on the shaft of said lower roller and the other thereof being secured on said upper shaft, said gears having teeth with leading and trailing faces relative to their respective directions of rotation,
      (2) a second pair of cooperating spur gears disposed adjacent the other end portion of said lower roller and one thereof being secured on the shaft of said lower roller and the other thereof being secured on said upper shaft, said gears having teeth with leading and trailing faces relative to their respective directions of rotation,
      (3) said first pair of gears being disposed relative to one another with the leading faces of the teeth of said one of said first pair of gears engaging the trailing faces of the teeth of said other thereof and said second pair of gears being disposed relative to one another and relative to said first pair of gears with the trailing faces of the teeth of said one of said second pair of gears engaging the leading faces of the teeth of said other gear of said second pair of gears,
      (4) whereby backlash between the gears and play between the shafts is reduced.

2. In an envelope-making machine having a frame structure comprising opposed end frame members:
   (a) a lower roller journalled in said end frame members, said lower roller comprising:
      (1) an elongated central shaft,
      (2) an elongated sleeve secured on said shaft, and
      (3) said sleeve having a female recess in the outer surface thereof,
   (b) an upper shaft journalled in said end frame members in general parallelism with said lower roller,
   (c) an embossing member on said upper shaft and having a male boss for cooperation with the recess of said lower roller for embossing envelopes passing between said lower roller and said upper shaft,
   (d) drive means for imparting rotation to said lower roller and said upper shaft and causing alignment between said male boss and said female recess as the envelope material passes therebetween, said drive means comprising:
      (1) a first pair of cooperating spur gears disposed adjacent one end portion of said lower roller and one thereof being secured on the shaft of said lower roller and the other thereof being secured on said upper shaft, said gears having teeth with leading and trailing faces relative to their respective directions of rotation,
      (2) a second pair of cooperating spur gears disposed adjacent the other end portion of said lower roller and one thereof being secured on the shaft of said lower roller and the other thereof being secured on said upper shaft, said gears having teeth with leading and trailing faces relative to their respective directions of rotation,
- (3) said first pair of gears being disposed relative to one another with the leading faces of the teeth of said one of said first pair of gears engaging the trailing faces of the teeth of said other thereof and said second pair of gears being disposed relative to one another and relative to said first pair of gears with the trailing faces of the teeth of said one of said second pair of gears engaging the leading faces of the teeth of said other gear of said second pair of gears, and
- (4) whereby backlash between the gears and play between the shafts is reduced, and
- (e) means on said upper shaft for maintaining the requisite spacing between said male boss of the upper shaft and said female recess of said lower roller and also for maintaining each pair of said first and second pairs of gears disposed with their pitch circles generally tangent.

3. In an envelope-making machine having a frame structure comprising opposed end frame members:
- (a) a lower roller journalled in said end frame members, said lower roller comprising:
  - (1) an elongated central shaft,
  - (2) an elongated sleeve secured on said shaft, and
  - (3) said sleeve having a female recess in the outer surface thereof,
- (b) an upper shaft journalled in said end frame members in general parallelism with said lower roller,
- (c) an embossing member on said upper shaft and having a male boss for cooperation with the recess of said lower roller for embossing envelopes passing between said lower roller and said upper shaft,
- (d) drive means for imparting rotation to said lower roller and said upper shaft and causing alignment between said male boss and said female recess as the envelope material passes therebetween, said drive means comprising:
  - (1) a first pair of cooperating spur gear disposed adjacent one end portion of said lower roller and one thereof being secured on the shaft of said lower roller and the other thereof being secured on said upper shaft, said gears having teeth with leading and trailing faces relative to their respective directions of rotation,
  - (2) a second pair of cooperating spur gears disposed adjacent the other end portion of said lower roller and one thereof being secured on the shaft of said lower roller and the other thereof being secured on said upper shaft, said gears having teeth with leading and trailing faces relative to their respective directions of rotation,
  - (3) said first pair of gears being disposed relative to one another with the leading faces of the teeth of said one of said first pair of gears engaging the trailing faces of the teeth of said other thereof and said second pair of gears being disposed relative to one another and relative to said first pair of gears with the leading faces of the teeth of said other of said second pair of gears engaging the trailing faces of the teeth of said one gear of said second pair of gears,
  - (4) whereby backlash between the gears and play between the shafts is reduced, and
- (e) means on said upper shaft for maintaining the requisite spacing between said male boss of the upper shaft and said female recess of said lower roller and also for maintaining each pair of said first and second pairs of gears disposed with their pitch circles generally tangent, said means comprising:
  - (1) a pair of circular collars secured on said upper shaft each one on an opposite side of said embossing member and adjacent a different one of the end portions of the sleeve of said lower roller, and
  - (2) said collars having outer cylindrical surface portions disposed in engagement with adjacent surface portions of the sleeve of said lower roller.

4. In an envelope-making machine having a frame structure comprising opposed end frame members:
- (a) a lower roller journalled in said end frame members, said lower roller comprising:
  - (1) an elongated central shaft,
  - (2) an elongated sleeved secured on said shaft, and
  - (3) said sleeve having a female recess in the outer surface thereof,
- (b) an upper shaft journalled in said end frame members in general parallelism with said lower roller,
- (c) an embossing member secured on said upper shaft and disposed generally intermediate the opposite ends thereof, said embossing member having a male boss for cooperation with and axially alignable with the recess of said lower roller for embossing envelopes passing between said lower roller and said upper shaft,
- (d) drive means for imparting rotation to said lower roller and said upper shaft and causing alignment between said male boss and said female recess as the envelope material passes therebetween, and
- (e) a pair of circular collars secured on said upper shaft each one on an opposite side of said embossing member and adjacent a different one of the end portions of the sleeve of said lower roller, said collars having:
  - (1) outer cylindrical surface portions disposed in engagement with adjacent surface portions of the sleeve of said lower roller for maintaining the requisite spacing between said male boss of the upper shaft and said female recess of said lower roller, and
  - (2) circumferential flange portions which cooperate with aligned circumferential grooves in said sleeve of the lower roller for insuring axial alignment between said female recess of the lower roller and embossing member.

References Cited by the Examiner
UNITED STATES PATENTS

| | | | |
|---|---|---|---|
| 1,261,903 | 4/1918 | Brown | 101—23 |
| 2,937,591 | 5/1960 | Wagner | 101—248 X |
| 2,943,560 | 7/1960 | Wrob et al. | 101—23 |
| 3,022,231 | 2/1962 | Broderick | 101—28 X |
| 3,214,309 | 10/1965 | DiLeo et al. | |

ROBERT E. PULFREY, *Primary Examiner.*

W. F. McCARTHY, H. P. EWELL, *Assistant Examiners.*